Oct. 4, 1960 T. R. SMITH 2,954,688
COMBINATION WASHER-DRIER TIMER CONTROL MECHANISM
Filed Aug. 11, 1959 3 Sheets-Sheet 1

Inventor
Thomas R. Smith
by Wilkinson Huxley Byron & Hume
Attorneys

Oct. 4, 1960 T. R. SMITH 2,954,688
COMBINATION WASHER-DRIER TIMER CONTROL MECHANISM
Filed Aug. 11, 1959 3 Sheets-Sheet 2

Inventor
Thomas R. Smith
by Wilkinson Huxley Byrne & Hume
Attorneys

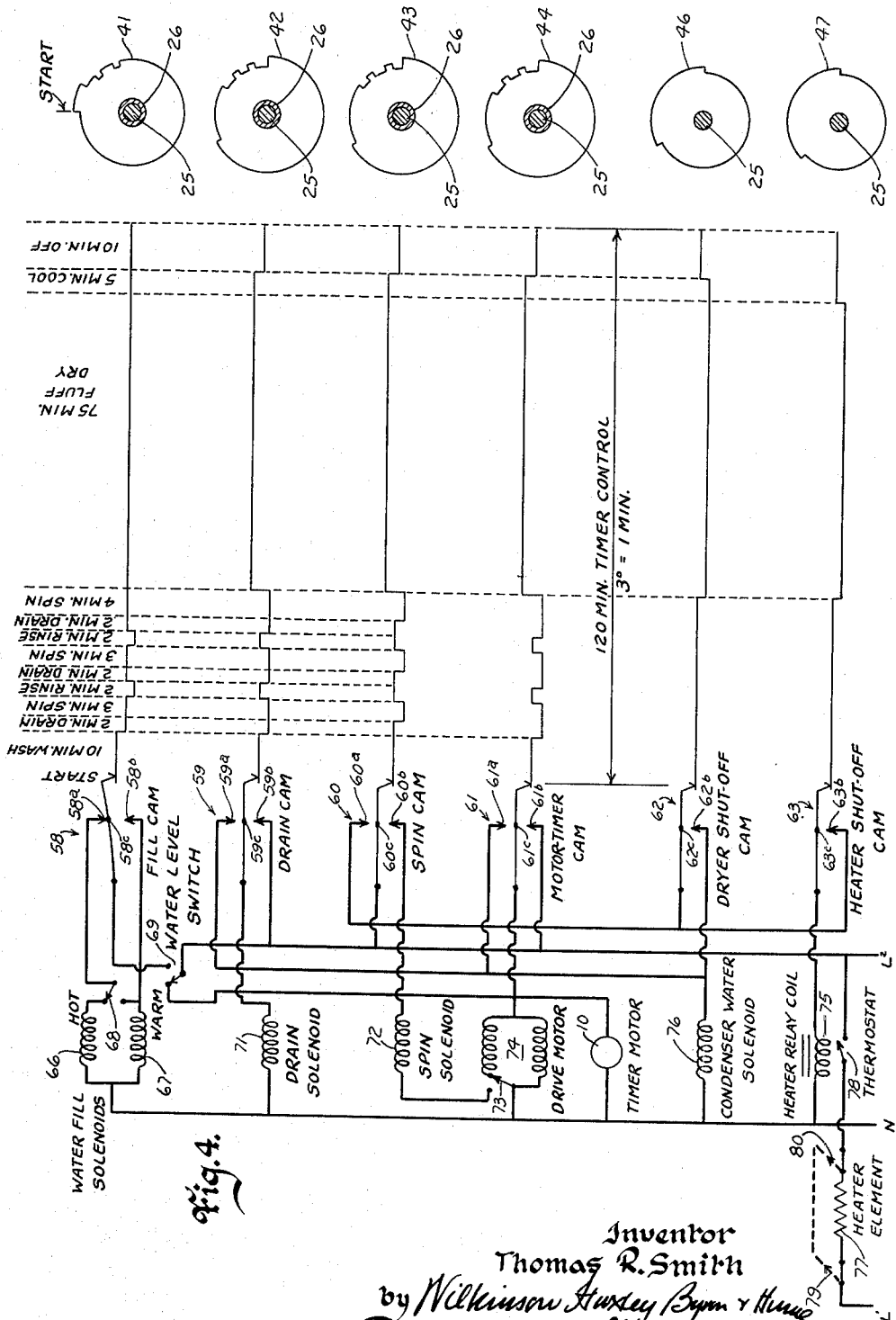

United States Patent Office 2,954,688
Patented Oct. 4, 1960

2,954,688

COMBINATION WASHER-DRIER TIMER CONTROL MECHANISM

Thomas R. Smith, Newton, Iowa, assignor to The Maytag Company, Newton, Iowa, a corporation of Delaware Filed Aug. 11, 1959, Ser. No. 832,985

2 Claims. (Cl. 68—12)

This invention relates to a single timer control mechanism capable of actuating at least two separate electrical circuits and operable to control and vary the timed actuation of one circuit with respect to the other. It particularly relates to a control for a combination washer-drier unit capable of washing and drying clothes in the same container and in which the drying operation automatically follows the washing operation without requiring further attention of the operator of the unit once the unit is preset and started.

In controlling the operation of a combination washer-drier unit attempts have been made to combine the controls common to the conventional washer with those controls common to the automatic clothes drier. The result has been a water temperature control for the automatic washer unit, a temperature control for the drier unit and a timer mechanism for each of the washing and drying circuits. In this type of arrangement the drier timer control is preset so as to start in operation automatically upon the termination of the washing cycle, and at the termination of the drying cycle the entire machine is shut down by the actuation of controls driven by the drier timer control.

It is an object of this invention to eliminate one of the two timer controls and to provide a single timer for controlling the entire washing and drying operation.

Another object of this invention is to provide a single timer control capable of regulating the timed interval between the actuation of two separate programmed electrical circuits.

A further object is to provide a single timer control for a combination washer-drier unit so as to vary the duration of or to completely eliminate either of the wash or dry periods.

Referring now to the drawings:

Figure 4 shows a combination washer-drier schematic wiring diagram (left side of figure) together with the control cams (right side of figure) for the actuation of the various circuits as diagrammatically illustrated by the developments of the respective control cams (center of figure).

Figure 1:
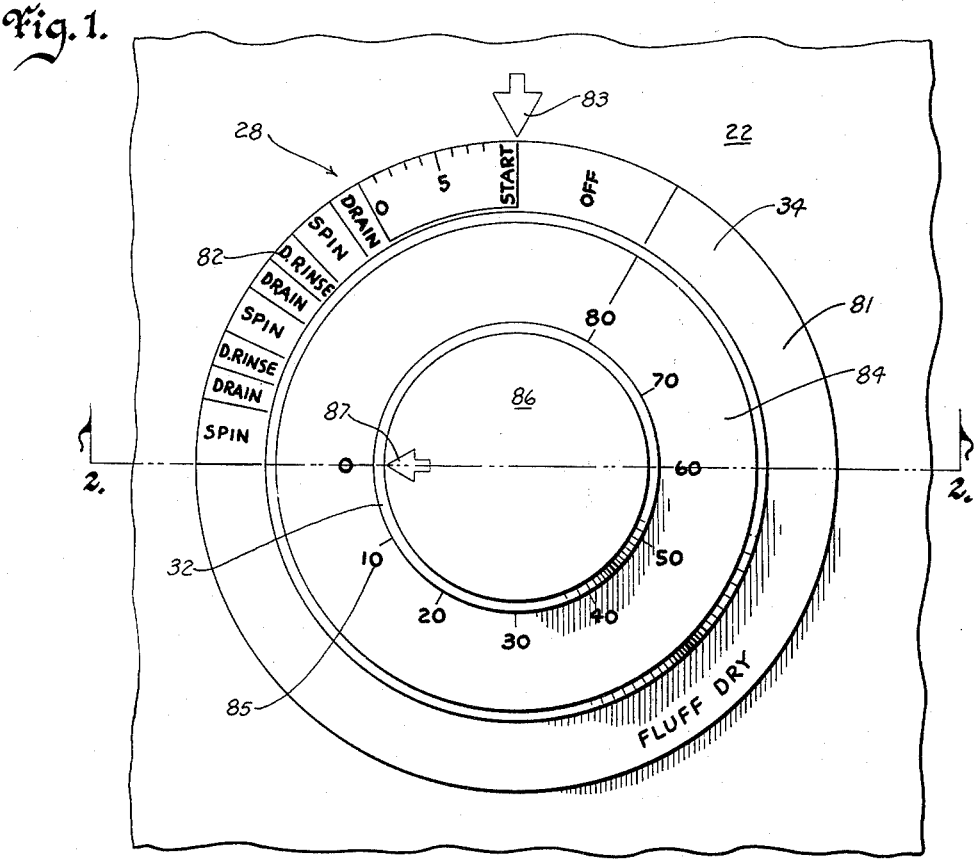
Figure 1 shows a top plan view of a combination timer control constructed according to my invention.
Figure 3:
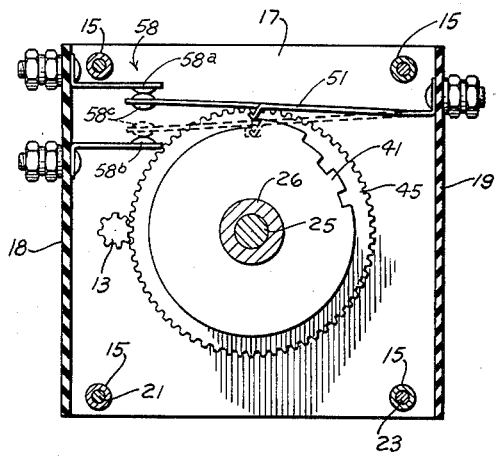
Figure 3 is a cross sectional view taken on line 3—3 of Figure 2 showing the relative position of one of the switch followers with respect to its actuating cam mechanism.
Figure 2:
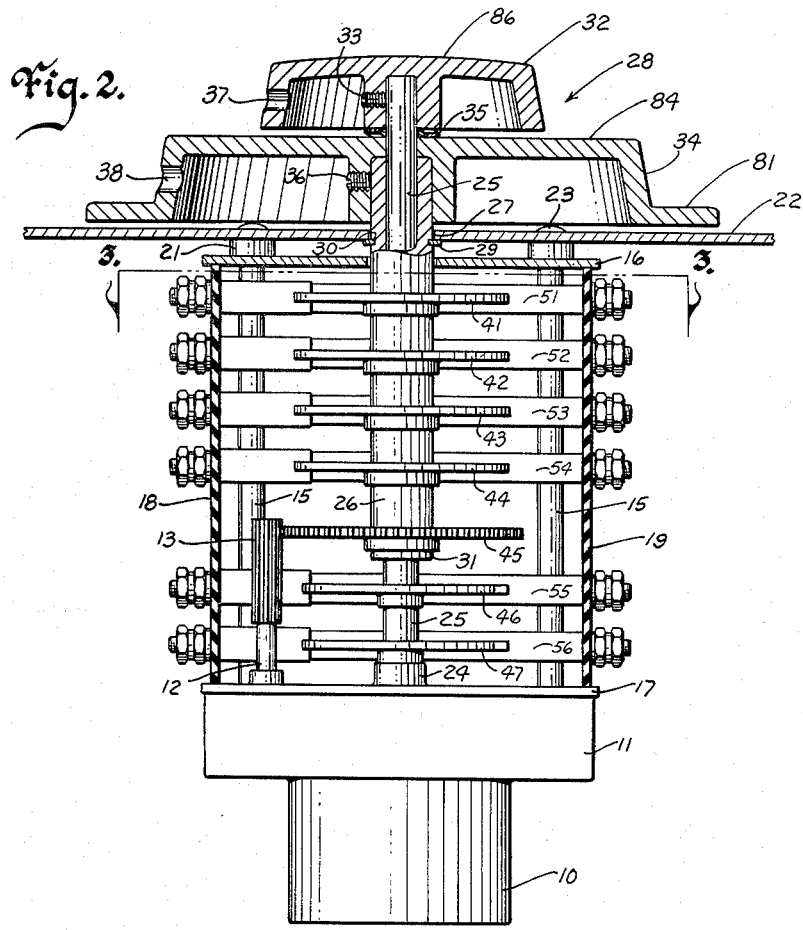
Figure 2 is a vertical cross section through line 2—2 of Figure 1 showing the relative position of the actuating cams with respect to their driving mechanism and control knobs.

Referring now to Figures 1 to 3 for an explanation of my invention, there is shown diagrammatically a clock timing motor 10 which drives through and is attached to speed reducing unit 11 which in turn drives through a conventional one-way clutch or a friction clutch (not shown) within unit 11 before terminating in driven shaft 12 and pinion 13. Tubular spacing members 15 abutting the respective top and bottom plates 16 and 17 together with insulated terminal boards 18 and 19 form a partially enclosed housing for the control unit and are held together by bolts 21 which pass through top plate 16, tubular spacing members 15, bottom plate 17 and screw into the housing of speed reducing unit 11. The entire unit thus formed may be readily attached to the combination washer and drier cabinet 22 or other types of control panels by screws or bolts fastened directly to top of plate 16 or by fasteners 23 threaded directly into the heads of bolts 21 as shown.

Bottom plate 17 is equipped with a thrust bearing 24 for inner shaft 25 which with its surrounding concentric shaft 26 passes upwardly through cabinet opening 27 before terminating into the control knob structure generally indicated by the numeral 28. Spring clip 29 carried in annular recess 30 of outer shaft 26 abuts cabinet 22 to prevent axial movement of that shaft towards cabinet 22 while shoulder 31 formed integrally with or formed from a sleeve fastened to inner shaft 25 prevents axial movement of this outer shaft in the opposite direction. Axial movement of inner shaft 25 is limited in one direction by shoulder 31, shaft 26 and spring clip 29 while being limited in the opposite direction by thrust bearing 24. Drier knob 32 is securely attached to inner shaft 25 by means of a set screw 33 accessible through opening 37 while washer knob 34 is fastened to outer concentric shaft 26 by means of set screw 36 accessible through opening 38.

Loosely surrounding inner shaft 25 between drier knob 32 and washer knob 34 is a resilient spring washer 35 having an undulant periphery and providing a friction coupling between knobs 32 and 34. Through the use of coupling washer 35 any rotation of knob 32 will produce a like rotation of knob 34. Likewise, rotation of knob 34 will produce a similar rotation of knob 32. However, if one of the two knobs is restrained against rotation, the other knob may be easily turned against the restraining action of washer 35 to provide a change in angular displacement between shafts 25 and 26.

In the present invention each knob and its respective shaft is designed to regulate or control a separate circuit or groups of circuits. In this particular embodiment of my invention cams 41, 42, 43 and 44 are securely attached to outer concentric shaft 26 and serve as actuating cams for various washing circuits. Also attached to outer concentric shaft 26 is gear 45 which meshes with pinion 13 to provide a drive for shaft 26 and its inner shaft 25 through spring clutch 35. The attachment of gear 45 to inner shaft 25 rather than to outer shaft 26 to rotate all control cams and knob structure 28 would be an alternative construction not in conflict with the teaching of my invention. Cams 46 and 47 are securely fastened to inner shaft 25 and serve to actuate the drying circuits. It should be noted at this point that while pinion 13 may drive outer concentric shaft 26 and its cams 41, 42, 43 and 44 in unison with inner shaft 25 and its cams 46 and 47, the angular relationship between the washer cams 41 et seq. and drier cams 46 and 47 may easily be changed to vary the timed interval between the actuation of the cam followers for the two groups of cams. It will be apparent as hereinafter explained that such a variation also produces a like variation between the programmed operation of the respective washer and drier circuits.

Each of the washer and drier cams actuates one of the respective spring cam followers 51, 52, 53, 54, 55 and 56 which are attached to insulating terminal board 19 and are spring urged towards the center of rotation of the cams. Each of the cam followers 51 et seq. extends beyond the axis of its actuating cam and carries at its free end a double contact forming part of either a two or three-position switch for the actuation of the respec tive washer and drier circuits. Though shown as attached to terminal board 19 only, cam followers 51 et seq. may be fastened to both terminal boards 18 and 19 in an alternating relationship provided that the cams, followers and switch structure affected are constructed to compensate for this 180° change in the positioning of the cam followers.

Figure 3 shows a detailed structural arrangement of three-position switch 58. Switch 58 is formed from the stationary contacts 58a and 58b fastened on insulating board 18 together with contact 58c carried on cam follower 51. Cam follower 51 rides on the three separate elevations provided on cam 41 to actuate switch contact 58c into the top position as shown in full lines in Figure 3 or in the bottom position as shown in dotted lines in the same figure or in an intermediate position between these two extreme positions.

One embodiment of a wiring diagram for a combination washer-drier unit which may be controlled by the timer unit is shown in Figure 4. Washer cams 41, 42, 43 and 44 together with drier cams 46 and 47 appear at the right side of Figure 4. All cams are shown aligned in their Start position and are shown as each would be separately viewed from the bottom of Figure 2. The intermediate portion of Figure 4 represents a development of each of the respective cams as each of these cams is rotated in a counter-clockwise position past the start reference line in Figure 4. The depending tongues of spring cam followers 51, 52, 53, 54, 55 and 56 are diagrammatically shown as contacting the developed surface of the respective cams. Each of the three-position switches 58, 59, 60 and 61, as well as the two-position switches 62 and 63, is directly controlled by its respective cam follower.

The wiring diagram shown on the left side of Figure 4 is designed for a combination washer-drier unit providing a choice of hot or warm water in the washing cycles by means of the conventional water fill solenoids 66 and 67 through selector switch 68. The unit is also provided with the conventional water level switch 69 (shown in the Full position) for energizing either of the solenoids 66 or 67 through contacts 58a and 58c of switch 58.

Drain solenoid 71 for moving a conventional drain valve (not shown) to its open position to drain the combination machine of all fluids is connected to the neutral wire N of the conventional Edison three-wire circuit having a potential of 230 volts between the conductors $L_1$ and $L_2$ and a potential of 115 volts between either conductor $L_1$ or $L_2$ and the neutral conductor N. Drain solenoid 71 is energized by the making of contacts 59b and 59c of switch 59 to connect the opposite side of solenoid 71 to line $L_2$.

Spin solenoid 72 which releases the conventional brake on the rotatable tub of the combination unit is energized only when centrifugal switch 73 of drive motor 74 is moved to its alternate position from the Start position shown in Figure 4. In addition, contacts 60b and 60c of switch 60 must be in electrical connection before spin solenoid 72 will be energized. Drive motor 74 and timer motor 10 are initially energized through neutral wire N and line $L_2$ when water level switch 69 responds to the desired water level within the unit and moves from Empty into the Full position shown in Figure 4.

The combination washer-drier unit incorporating the illustrative circuit of Figure 4 utilizes the water condenser principle to remove evaporated moisture from within the unit though a blower system may also be used without departing from the teaching of my invention. Water condenser solenoid 76, which controls an external valve (not shown) to provide a vapor condensing film of cool water within the combination unit, is energized through neutral wire N and line $L_2$ by means of contacts 62b and 62c of switch 62 and contacts 60a and 60c of switch 60.

Heating element 77 used to evaporate the moisture from the fabrics during the drying cycle is connected in series with temperature limiting thermostat 78 across lines $L_1$ and $L_2$ through relay switches 79 and 80. Switches 79 and 80 isolate both sides of heating element 77 from the remainder of circuit and are mechanically controlled by the solenoid armature of heater relay coil 75 which in turn is energized through contacts 63b and 63c as well as contacts 60a and 60c. This circuit construction not only isolates the heating unit 77 from the timer control, but also permits the use of a smaller timer mechanism of lower current carrying capacity for the combination unit.

It should be noted that while a reduction of the drying period by an amount equal to or greater than the washing period may close switches 62 and 63 in the circuits of solenoids 76 and 75 and that neither of these last named circuit components will be energized until the highest peripheral portion of cam 43 has passed the Start reference line of Figure 4 (at the end of the washing operation) to prevent solenoid 76 and heating unit 77 from ever operating during the washing cycles.

For illustrative purposes a 120 minute timer driven by timer motor 10 is used to sequentially actuate the electrical circuits schematically shown at the left of Figure 4 over a predetermined number of fabric treatment intervals as indicated in the central portion of Figure 4. A series of wash, drain, spin and rinse periods comprise the entire washing cycles while a 75 minute fluff dry period together with a five minute cooling period completes the drying cycle. A reset portion equivalent to a ten minute interval of rotation of the timer provides an Off position in which all of switches 58 et seq. are in their intermediate positions.

In the operation of my invention as embodied in a combination washer-drier unit and without relative rotation of the wash cams with respect to the drier cams, a counter-clockwise rotation of all cams past the Start reference line of Figure 4 moves the respective cam followers from the Off position to the ten minute Wash position and causes contacts 58a and 58c to make an electrical connection through switch 58. This completes an electrical circuit from neutral wire N through one of the selected fill solenoids 66 or 67 through water selector switch 68 through contacts 58a and 58c and through the alternate Empty position of water level switch 69 (shown in Full position in Figure 4) to line $L_2$. The energization of the selected water fill solenoid 66 or 67 causes water to enter the combination unit until a predetermined water level is reached within that unit to actuate water level switch 69 into the Full position as shown in Figure 4.

At this time drive motor 74 and timer motor 10 are energized from neutral line N through water level switch 69 and line $L_2$. Drive motor 74, as energized through its starting winding, immediately starts the agitation of the clothes within the combination unit. When motor 74 reaches a predetermined speed, the centrifugal switch 73 switches into the alternate position from that shown in Figure 4 but as switch 60 is in its intermediate position, no additional circuits are energized at this time. Timer motor 10, in parallel with drive motor 74, causes inner shaft 25 and outer shaft 26 to rotate their respective cams in unison in a counter-clockwise direction past the Start reference line (Figure 4). This rotation of shafts 25 and 26 produces an effect similar to that obtained by moving the developments of each of the respective cams towards the left past its follower as diagrammatically illustrated in the central portion of Figure 4.

The termination of the ten minute wash period initiates a two minute drain period in which contacts 58a and 58c break and assume an intermediate position while switches 59 and 61 move from their intermediate positions into positions in which contacts 59b and 59c and contacts 61b and 61c are respectively made. This causes drain solenoid 71 to be energized through switch 59 while connecting a parallel circuit around water level switch 69 to maintain drive motor 74 and timer motor 10 energized through switch 61 while the washing fluid is being drained from the machine.

At the termination of the two minute drain period, contacts 60b and 60c make an electrical connection causing the energization of spin solenoid 72 through those contacts and centrifugal switch 73 which is maintained in the alternate position from that shown in Figure 4 by the energized motor 74. As previously stated, the energization of spin solenoid 72 releases the brake on the rotatable tub within the machine to permit that tub to centrifugally extract the fluids from within the fabrics by a high speed rotation of the tub.

The three minute spin period is followed by a two minute rinse period in which contacts 58b and 58c contact each other to provide for the energization of warm water fill solenoid 67. Note that this circuit is completed regardless of the position of switch 68. Drain solenoid 71 is of course de-energized by switch 59 to permit the filling of the tub within the unit. Switch 60 again assumes its intermediate position when contacts 60b and 60c are broken to de-energize spin solenoid 72 to permit normal agitation of the fabrics during this rinse period. Switch 61 also assumes an intermediate position during the two minute rinse period and relinquishes control over drive motor 74 and timer motor 10 to water level switch 68 which energizes these respective motors when a predetermined water level is reached to throw switch 69 into the Full position shown on Figure 4.

The two minute rinse period is followed by a two minute drain period in which all switches function as they did in the first two minute drain period. Switch 58 assumes an intermediate position to de-energize the water fill solenoids 66 and 67 while switch 59 energizes drain solenoid to permit an external drain valve (not shown) to open and drain the combination unit. Switch 60 remains in its intermediate position during the two minute drain period while switch 61 again provides an electrical connection between its contacts 61b and 61c for an energizing circuit for drive motor 74 and timer motor 10 while water level switch 69 is in the Empty position during the drain period.

The two minute drain period is followed by a three minute spin period in which only switch 60 changes position to energize spin solenoid 72 through contacts 60b and 60c.

In the illustrated embodiment, this drain period is followed by a two minute rinse period, another two minute drain period and a four minute spin period which completes the washing operation and places the fabrics in a damp dry condition preparatory to the drying operation. These latter wash periods are controlled in a manner similar to the operation of the earlier rinse, drain and spin periods as is apparent from Figure 4. The washing operation is completed upon the termination of the four minute spin period. At this point switch 58 breaks the fill solenoid circuits by assuming an intermediate position which is maintained throughout the following drying operation.

At the beginning of the drying operation the highest peripheral portion of cam 43 causes contacts 60a and 60c to complete that portion of the drying circuit in series with the parallel circuits containing water condenser solenoid 76 and heater relay coil 75 which are energized when the respective switches 62 and 63 are closed by the actions of cams 46 and 47. Heater relay coil 75 moves its armature to close relay switches 79 and 80 to energize heating element 77 through lines $L_1$ and $L_2$.

In the embodiment of Figure 4 the moisture evaporated from the fabrics within the combination unit will be condensed on the water film condenser under the control of solenoid 76. It should be noted that drain solenoid 71 remains energized through contacts 59a and 59c during the drying cycle while water condenser solenoid 76 is energized in order to empty the condensing fluid and condensate from the combination unit. To maintain drive motor 74 and timer motor 10 energized during the drying period when there is no water within the combination unit, an energizing circuit through contacts 61a and 61c is completed between line N and line $L_2$ during the drying operation. While timer motor 10 slowly advances all cams into their respective cam followers, drive motor 74 constantly tumbles the fabrics by means of suitable mechanism (not shown) during the evaporation of the moisture from the fabrics by heating unit 77.

Five minutes prior to the termination of the drying operation contacts 63b and 63c break to de-energize heater relay coil 75 and isolate heating element 77 from lines $L_1$ and $L_2$. As no other switches are moved during the following five minute interval, the vapor condensing action of the water film condenser continues while the tumbling clothes cool down for handling by the operator at the end of the drying operation. At the termination of the five minute cool-down period switches 58 et seq. assume their intermediate positions de-energizing drive motor 74, timer motor 10 and all energized solenoids. This completes the drying cycle and the clothes are now ready for removal from the machine.

Referring particularly to the application of my novel timer control to the illustrative circuit described, it may be noted from Figure 2 that a manual rotation of either the drier knob 32 or the washer knob 34 will produce a like rotation of inner shaft 25 and outer concentric shaft 26 by reason of friction clutch spring 35. Such a rotation will move all cams in unison past their respective cam followers and will cause the combination unit to function as if the cams were moved to such various stages of the fabric treatment cycle by timer motor 10. Consequently, it should be apparent that the unit may be started at any point in either of the wash or dry periods and that the wash cycle may be entirely eliminated by the proper rotation of the control structure 28 as an integral unit. Manipulation of the knob structure 28 in unison does not, however, produce any relative variations between the actuation of the washing and drying operations.

Referring now to the plan view of the combination timer shown in Figure 1, it may be seen that washer knob 34 carries on its outer flange 81 indicia 82 corresponding to the various stages of the wash periods as shown in Figure 4. Indicia 82 are constructed on knob 34 so as to pass reference arrow 83 on cabinet 22 during the rotation of knob 34. Washer knob 34 also carries on its upper surface 84 surrounding drier knob 32 indicia 85 corresponding to the stages of the drying cycle as illustrated in Figure 4. Drier knob 32 carries on its upper surface 86 reference arrow 87 to indicate relative movement between knob 32 and knob 34 as well as the duration of the preset drying period.

Thus as knob structure 28 is rotated in a clockwise direction as viewed in Figure 1, washing indicia 82 moves relative to reference arrow 83 to indicate various stages of the washing operation. A 90° rotation of wash knob 34 eliminates the entire washing operation and moves all wash control cams through the washing cycles to the beginning of the drying cycles so that numeral 0 of indicia 85 is opposite reference arrow 83. A rotation of knob 34 through a smaller arc will eliminate that portion of the washing cycle which passes arrow 83.

To obtain a drying period of maximum timed duration, reference arrow 87 on knob 32 must be turned from its position in Figure 1 to a position in which it is opposite the numeral 80 appearing in indicia 85 on wash knob 34. This adjustment will align the wash and dry cams as shown in Figure 4. The rotation of knob 32 relative to knob 34 is achieved by grasping knob 34 and turning knob 32 clockwise (Figure 1) until arrow 87 is opposite numeral 80 in drying indicia 85. Thus as preset for the maximum drying period and turned by timer motor 10, knob structure 28 rotates relative to reference arrow 83 in a clockwise direction as viewed in Figure 1 until numeral 80 in indicia 85 passes arrow 83 when the entire unit will automatically shut down.

To adjust the duration of the drying period from the maximum duration just described, the movement of knob 32 relative to knob 34 past indicia 85 will produce a drying period corresponding to the numbers appearing opposite arrow 87. In the position shown in Figure 1 the drying period has been reduced to zero so that the combination washer-drier unit will terminate its operation immediately following the end of the washing operation. Note that regardless of the duration of either of the wash or dry periods or the initial positioning of reference arrow 87, the entire unit will be shut down when arrow 87 is aligned with stationary arrow 83.

With a control as that embodied in this invention the washing operation may be initiated at any stage during the entire programmed washing cycle or may be entirely eliminated. The drying operation may also be varied by movement of knob 32 relative to knob 34 so as to permit drier cams 46 and 47 to actuate their respective switches 62 and 63 sooner than if no relative movement had taken place between knobs 32 and 34. In effect, then, the movement of knob 32 relative to knob 34 subtracts time from the beginning of the drying cycle. If enough time is subtracted from the drying cycle, there will be no drying period and the position of the knobs 32 and 34 with respect to each other will be as that of Figure 1.

From this it can be seen that once the operator has preset the relative positions of knobs 32 and 34 with respect to each other for the proper dried duration and has initiated the washing operation in the desired operating point of the washing cycle, the operator may place soiled clothes in a machine utilizing this control and leave them under the control of the combination unit until the fabrics are completely washed, rinsed and dried.

This is a continuation-in-part of application Serial No. 457,958, filed September 23, 1954, and now abandoned.

In the drawings and specification there has been set forth a preferred embodiment of the invention, and although specific terms are employed, these are used in a generic and descriptive sense only, and not for purposes of limitation. Changes in form and the proportion of parts, as well as the substitution of equivalents are contemplated, as circumstances may suggest or render expedient, without departing from the spirit or scope of this invention as further defined in the following claims.

I claim:

1. In a combination washer-drier adapted to be programmed through washing operations and drying operations, a first shaft in the form of a sleeve, a second shaft mounted in and concentrically to said first shaft with an extension projecting beyond said first shaft, coupling means for driving said first and second shafts in unison and for permitting selected manual relative rotation therebetween, drive means for rotating one of said shafts and indirectly driving the other of said shafts through said coupling means, drier circuit means for controlling the drying operations, first and second switch means for controlling said drier circuit means, cam means affixed directly only to said first shaft for controlling the washing operations and first switch means, second cam means affixed directly only to said extension of said second shaft projecting beyond said first shaft for controlling said second switch means, and means including a manually operated member for adjusting the angular relationship of said shafts to vary the length of the drying operation.

2. In a combination washer-drier, a drier heater for drying clothes, circuit means for energizing said drier heater, a first switch in said circuit means for initiating a drier heating period, a second switch in said heater circuit for terminating the drier heating period, two concentric shafts, coupling means for driving said shafts in unison in the same direction and for permitting selected manual relative rotation therebetween, drive means for rotating one of said shafts and indirectly driving the other of said shafts through said coupling means, means affixed directly only on one of said shafts for operating said first switch, means affixed directly only on the other of said shafts for operating said second switch, and means including a manually operable member for adjusting the angular relationship of said shafts to vary the length of the drier heating period.

References Cited in the file of this patent

UNITED STATES PATENTS

| | | |
|---|---|---|
| 2,561,348 | Dunham | July 24, 1951 |
| 2,656,695 | Miller | Oct. 27, 1953 |
| 2,868,004 | Runde | Jan. 13, 1959 |
| 2,881,609 | Brucken | Apr. 14, 1959 |